July 31, 1956  R. M. ANDERSON  2,757,019
TRACTOR DRAFT BAR ASSEMBLY
Filed March 3, 1953

Inventor
Reynold M. Anderson
by W. Gerald
Attorney

United States Patent Office 2,757,019
Patented July 31, 1956

2,757,019

TRACTOR DRAFT BAR ASSEMBLY

Reynold M. Anderson, Gadsden, Ala., assignor to Allis-Chalmers Manufacturing Company, Milwaukee, Wis.

Application March 3, 1953, Serial No. 339,963

1 Claim. (Cl. 280—499)

This invention relates to draft apparatus of the type carried by a tractor or other vehicle for establishing a propelling connection with a rear attached wagon, implement or the like.

More particularly, the present invention is concerned with the provision of a detachable drawbar structure incorporating features of construction and combination designed to minimize the initial and replacement cost and to materially reduce the time and effort necessary for attaching, adjusting and removing the drawbar or worn parts thereof.

In the constructions heretofore employed it has been customary to provide the top side of a drawbar with a bracket part fixed thereon so as to form therewith a forwardly or rearwardly opening socket slidably supported on the transversely disposed bight portion of a tractor carried bail or other suitable support. Also, as an alternative construction, it has been customary to provide the drawbar with a loop part fixed thereon to slidably receive and thus support the drawbar on the bight portion of a transversely disposed bail or other type of bar support, the drawbar being thus positioned for limited swinging movement transversely relative to the direction of travel. Still another arrangement utilizes a drawbar receiving loop fixed to the transversely disposed bight portion of a tractor carried bail.

These known arrangements, while affording an adequate support for the drawbar, have not proved entirely satisfactory in that if the bracket or loop part is fixedly attached to the drawbar or bail as by welding, then when the bracket or loop part wears sufficiently to require replacement the drawbar or bail, together with the bracket or loop part must either be replaced as a unit or the bracket or loop part cut away and a new one welded in place. The time and expense involved in effecting such a change constitutes a serious objection to the use of apparatus of this type.

Ordinarily, the size and cost of the bracket which is fixed to the drawbar are less than those of the loop which is fixed to the bail, but it is sometimes desirable that the drawbar be adjustable in the direction of its length, and in that case the less expensive bracket cannot readily be used and the more expensive loop which is fixed to the bail would be more suitable. Drilling a hole or holes into the drawbar for the purpose of securing the bracket by means of a bolt or bolts weakens the drawbar at the very part where it is subject to greatest bending stresses. Hence, if the bracket is to be secured to the drawbar by bolts rather than by welding, it becomes necessary to make the drawbar heavier than when the drawbar is solid and the bracket is secured to it by welding.

Generally, it is an object of the present invention to provide an improved drawbar and support assembly in which the drawbar is connected in vertical load transmitting, laterally shiftable relation with a supporting bail; in which the drawbar is lockable against or, when desired, releasable for such lateral shifting movement; and in which the drawbar is also adjustable in the direction of its length relative to the bail; all without welding a bracket to the drawbar or weakening the drawbar at its connection with the bail, and without making the entire structure more expensive than the heretofore used constructions in which the bracket is welded to the drawbar.

More specifically, it is an object of the invention to provide an improved single piece connecting element between the drawbar and bail, which retains the drawbar vertically on the bail in laterally shiftable relation to the latter, and which is relatively simple in construction, readily replaceable when worn, and inexpensive to manufacture.

Accordingly, this invention may be considered as comprising the constructions, combinations and subcombinations of parts as is hereinafter more fully set forth in the detailed description and appended claim, reference being had to the accompanying drawings, in which:

Figure 1:
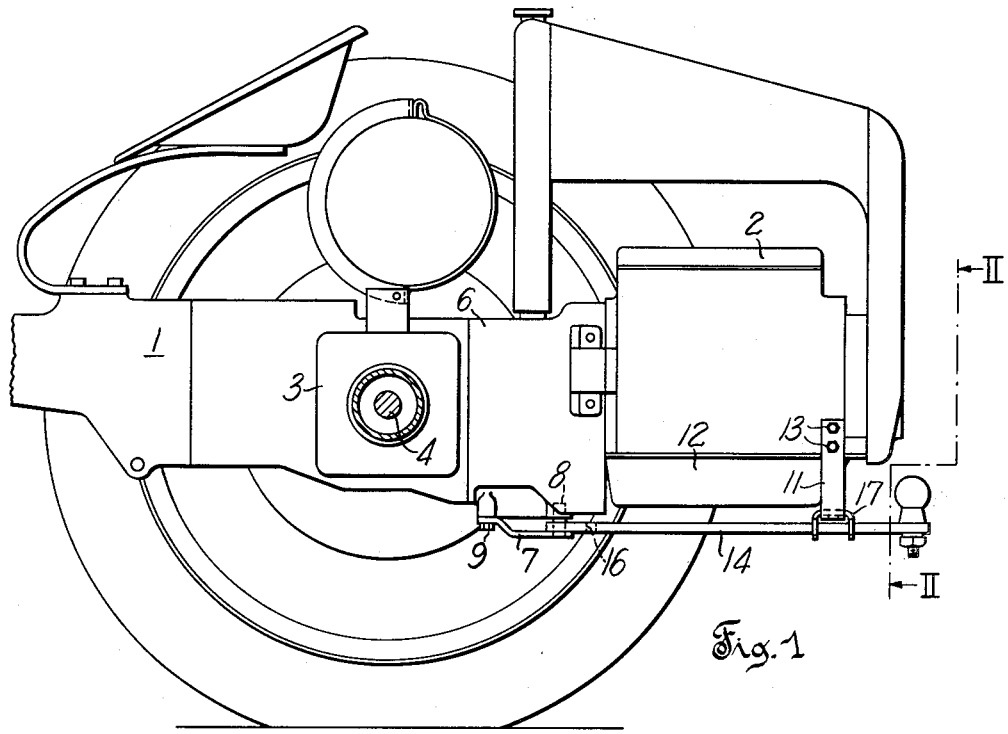
Fig. 1 is a side elevation of a rear portion of a tractor with the near rear wheel removed and parts omitted to better show the construction and arrangement of a drawbar and support assembly embodying the invention.

Referring particularly to Fig. 1, it will be seen that the invention is applied to a tractor 1 having an engine 2 disposed in rearwardly extended cantilever relationship to the rear axle structure 3. Engine 2 operatively transmits power to the axle shaft 4 by means of a suitable mechanism enclosed in the housing 6 rigidly uniting the engine 2 with the rear axle structure 3. It is to be understood that the usual clutch, brake and throttle controls have been omitted in the interest of clarity as they form no part of the present invention. However, if more detailed information is desired concerning the construction, arrangement and operation of the tractor partially illustrated and described herein, reference may be had to U. S. Patent No. 2,580,480, Walter F. Strehlow, dated January 1, 1952.

The underside of tractor 1, in this case the transmission housing 6, is provided with a pair of longitudinally spaced holes of which the forward one is internally threaded to receive a cap screw or the like and the latter has a smooth internal bore. A drawbar attaching part 7 presents an upwardly offset forward portion provided with a cap screw receiving opening which is aligned with the internally threaded bore whereas the rearward portion of part 7 is provided with an upstanding pivot pin 8 which is disposed in the rear one of said bores when the hole in the upwardly offset forward portion is aligned with the internally threaded bore. A cap screw or the like 9 fixedly screws part 7 to the underside of the tractor as shown. A U-shaped bail or bar-like support 11 presents vertically extending legs fixedly attached to opposite rear side portions of the engine 2 and presents a horizontal base portion extending transversely of the direction of tractor travel and underlying the oil pan 12 of the engine in spaced relation thereto. Preferably the bail 11 is detachably secured to the engine block by cap screws or the like 13.

A drawbar 14 is detachably secured to part 7 and is in part supported by bail 11 through means of a pair of longitudinally spaced openings 16 in the forward portion thereof, which are selectively positionable to receive the upstanding pin 8 integral with part 7. A supporting connection between the bail 11 and drawbar 14 is effected by means of an inverted U-shaped part 17 straddling the base portion of bail 11 with its legs depending therebeneath. The U-shaped part 17 has an inner bight surface portion which bears vertically upon the upper surface of the horizontal bail part 11, and the legs of the U-shaped part project beyond the bottom surface of the horizontal bail part 11 and are provided with openings 18 aligned therethrough on an axis extending transversely of the bar like support 11, with the openings 18 conforming generally in size and shape with the cross sectional configuration of the drawbar 14. It will be appreciated that when installed in operating position the top sides of the openings 18 are spaced from the inner side of the bight portion of the U-shaped part 17 a distance somewhat greater than the thickness of the bail 11.

In attaching the drawbar to the tractor, the inverted U-shaped part 17 is positioned to straddle the base portion of fixed bail 11 and one end portion of bar 14 is then slidably inserted through the aligned openings 18 in the leg portions of the part 17. Next the attaching part 7 is positioned with the pin 8 thereof inserted through the selected one of the two holes 16 in the other or forward end portion of the drawbar, whereupon the forward end of this part is fixedly secured to the tractor by inserting and tightening the cap screw 9. The purpose of the longitudinally spaced holes 16 in the forward end of drawbar 14 is to vary the distance between the hitch part receiving or rear end thereof and the fixed tractor carried bail 11.

Figure 2:
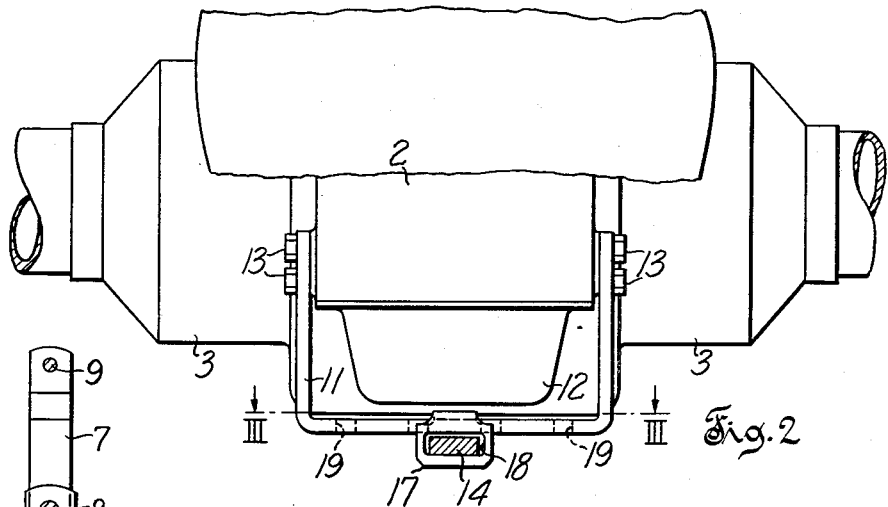
Fig. 2 is a partial rear elevation of the structure shown in Fig. 1 taken generally on line II—II thereof.
Figure 3:
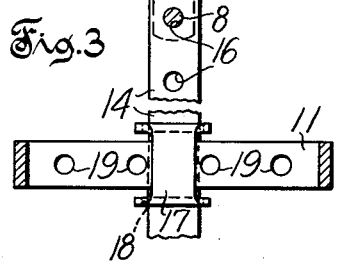
Fig. 3 is a plan view of the drawbar and support assembly shown in Figs. 1 and 2, this view being taken generally as indicated by line III—III on Fig. 2.

Referring particularly to Figs. 2 and 3, it will be noted that the base portion of fixed bail 11 is provided with a transversely aligned series of holes 19 therethrough, these holes being spaced apart a distance a trifle greater than the width of the bail contacting bight portion of the inverted U-shaped part 17 which bears upon the horizontal portion of the bail 11 in a direction generally parallel to the axis of the pivot pin 8. Consequently, as is best seen in Fig. 3, the drawbar may be positioned with a pair of holes 19 disposed closely adjacent opposite sides of the bar whereupon bolts or pins (not shown) may be inserted to prevent a lateral swinging movement of the drawbar. Also, bolts or pins may be selectively positioned in others of these holes in the event it is desired to limit lateral swinging movement of this bar to a lesser degree than that permitted by the upwardly extending legs of part 11. Further, in this connection, it will be noted that the legs of the inverted U-shaped part 17 are spaced apart longitudinally of the drawbar a distance greater than the width of the base portion of part 11, this being done to provide a clearance between the inner surface of these legs and the edge surfaces of the base of part 11 which is sufficient to permit the drawbar to swing laterally the full distance between the upwardly extending legs of the fixed tractor carried bail.

The structure just described obviously affords a vertical load transmitting support for the rear portion of a drawbar through means of an assembly which can be attached, removed and parts readily replaced when worn with a minimum of time, effort and skill. In addition, the drawbar can be readily adjusted longitudinally of the tractor, when desired, simply by removing part 7 and moving the drawbar to bring the other one of its holes 16 into alignment with that in the tractor positioned to receive the pin 8. Preferably the relationship of the draft bar 14 to the base portion of the tractor carried bail 11 or other suitable support mounting U-shaped part 17 is generally such that the pivot support afforded by the pin 8 of attaching part 7 is spaced approximately equal distances from the opposite ends of said base portion or other support. In this connection, it is believed that the manner in which the drawbar and the assembly supporting same can be attached or removed, as desired, should be perfectly apparent from the foregoing, and that therefore a further description in this respect is unnecessary.

A drawbar and support assembly such as herein shown and described fulfills the objects and affords all of the advantages set forth in that portion of the specification preceding the detailed description. Further, it should be apparent that the drawbar and support assembly of this invention has utility and advantages in combination with draft bars other than those designed for attachment to the rear of a tractor. Therefore, while the invention has been shown and described as applied to a rear attached tractor drawbar, it is to be understood that the invention is applicable in its broad aspects to a draft bar irrespective of whether attached to the rear or other portion of a tractor and irrespective of whether the bar extends longitudinally of the tractor or in transverse relation thereto. Consequently, it is not intended that the claim be limited to exact details of the construction herein disclosed for purposes of illustration, as various modifications, within the scope of the appended claim, may occur to those skilled in the art.

It is claimed and desired to secure by Letters Patent:

In a mobile structure having a bar-like support positioned thereon so as to extend horizontally in transverse relation to the direction of travel and a vertical pivot support spaced longitudinally of said structure from said bar-like support, the combination comprising: a U-shaped part supportedly mounted on said bar-like support in inverted freely straddling relation thereto with an inner bight surface portion of said part slidably bearing upon the top surface of said bar-like support and having a pair of spaced legs depending beneath the bottom surface of said bar-like support, said legs having openings therethrough aligned on an axis extending transversely of said bar-like support and with the top sides of said openings spaced from the inner side of said bight portion of said part a distance somewhat greater than the thickness of said bar-like support straddled by said part; and an elongated drawbar having one end portion slidably inserted through said aligned openings for support by said U-shaped part and having the other end portion detachably carried by said pivot support for swinging movement about the latter to permit movement of said first mentioned end portion and U-shaped part along said bar-like support in transverse relation to the direction of travel, said end portion of said drawbar having a cross sectional configuration conforming generally with the shape and size of said aligned openings.

References Cited in the file of this patent

UNITED STATES PATENTS

| | | |
|---|---|---|
| 760,757 | Richards | May 24, 1904 |
| 1,068,334 | Goodhue | July 22, 1913 |
| 1,362,154 | Towner et al. | Dec. 14, 1920 |
| 1,438,831 | Jones | Dec. 12, 1922 |
| 2,138,512 | Rogers | Nov. 29, 1938 |
| 2,462,726 | Currie | Feb. 22, 1949 |

FOREIGN PATENTS

| | | |
|---|---|---|
| 469,190 | Canada | Nov. 7, 1950 |
| 487,006 | Canada | Oct. 7, 1952 |